Patented Oct. 11, 1927.

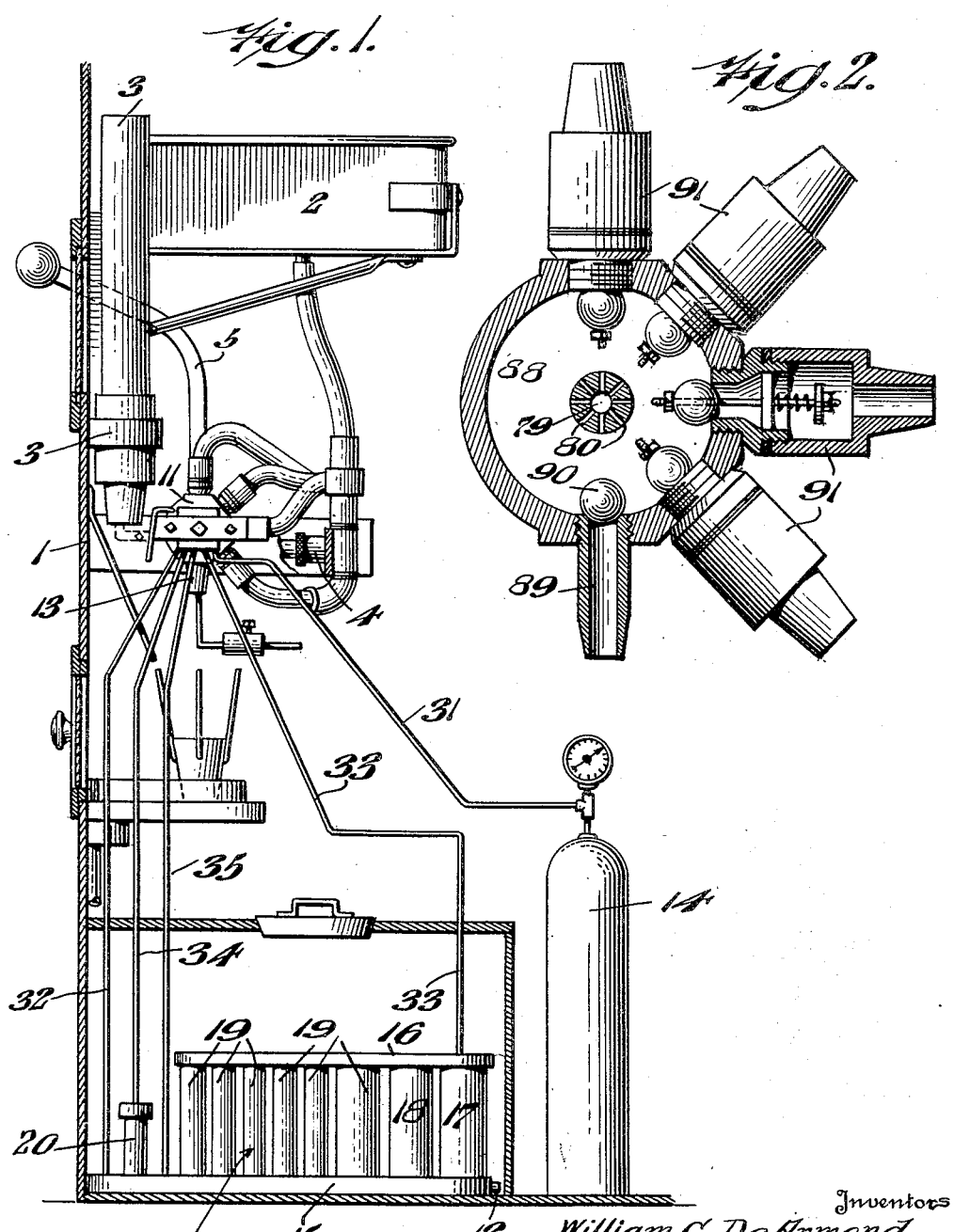

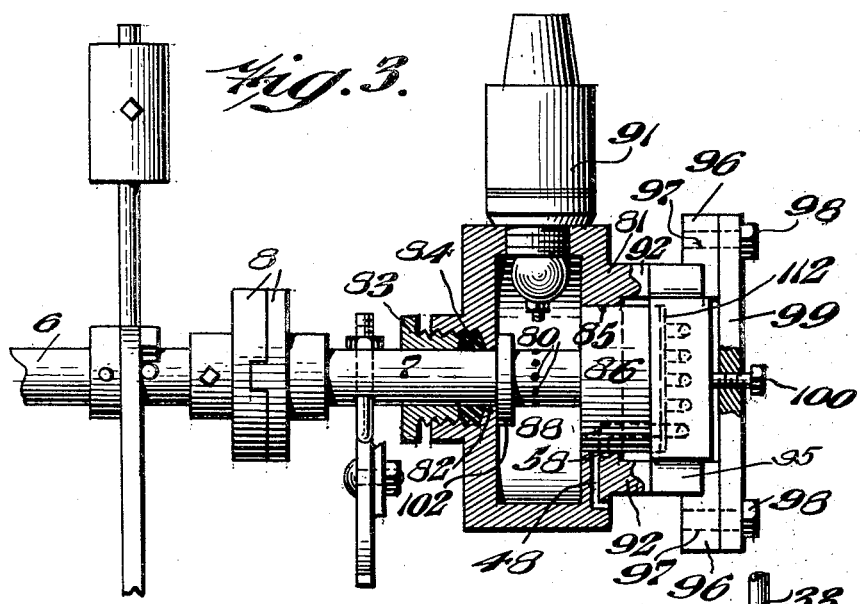
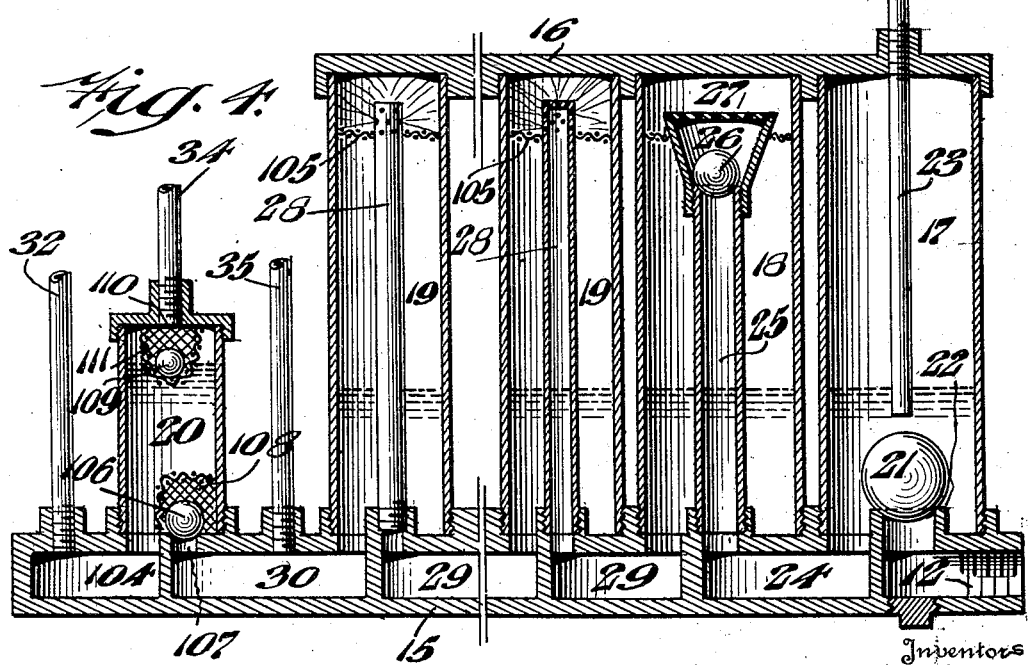

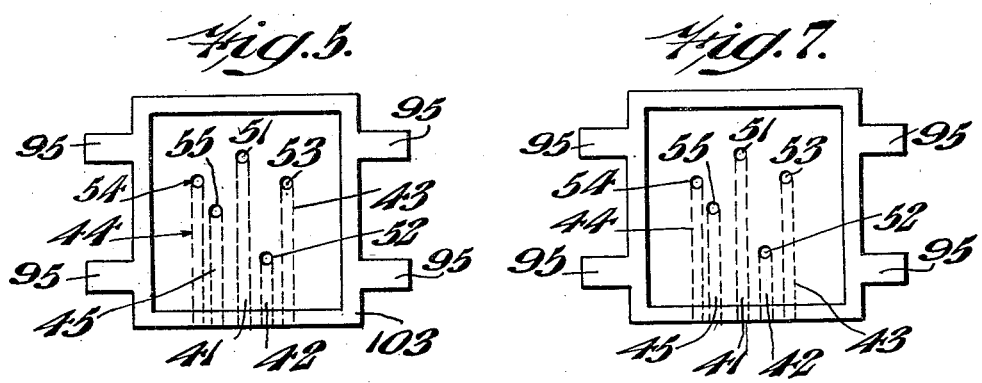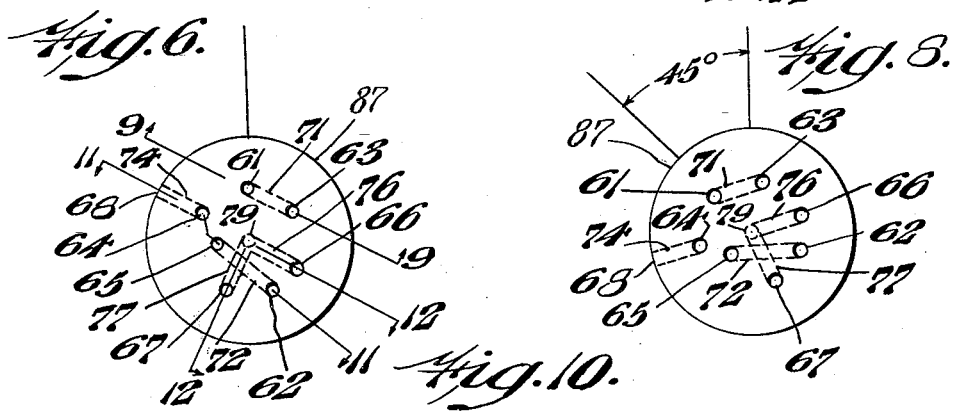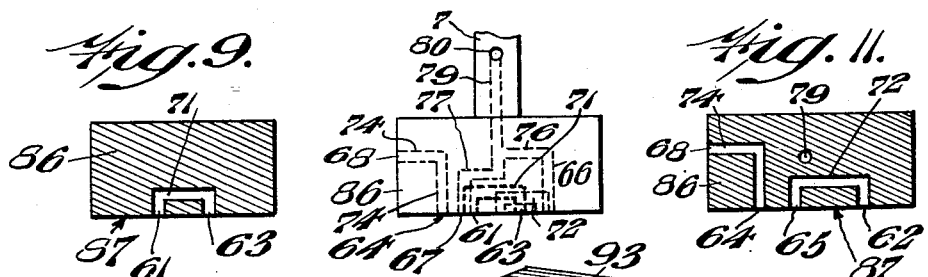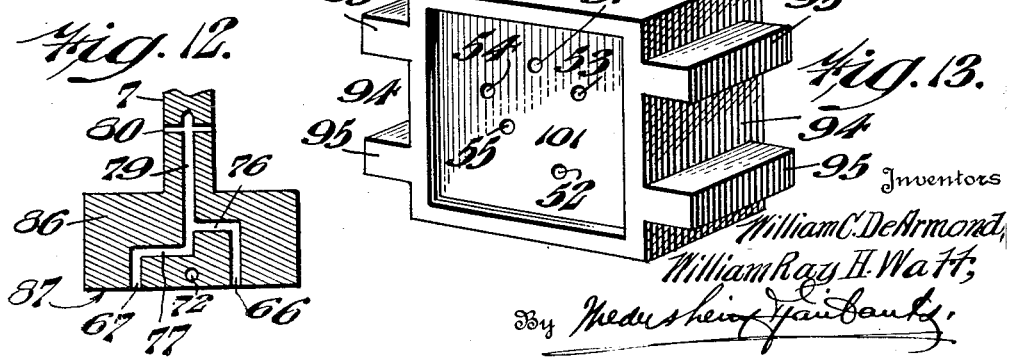

1,645,320

UNITED STATES PATENT OFFICE.

WILLIAM C. DE ARMOND AND WILLIAM RAY H. WATT, OF PHILADELPHIA, PENNSYLVANIA.

WATER-CARBONATING APPARATUS.

Application filed October 21, 1925. Serial No. 63,828.

Our invention relates to a new and useful water carbonating apparatus of the general type disclosed in our copending application Serial #40,997 filed July 2, 1925, and it relates more particularly to a novel water carbonating device whereby a constant supply of carbonated water may be kept on tap for whatever purpose it may be desired, such as, for soda fountain use or for use in connection with the automatic mixing and dispensing apparatus as disclosed in our copending application above identified.

Our invention further relates to a novel carbonating apparatus wherein a fresh supply of water is drawn into the apparatus, passed through the apparatus and discharged therefrom automatically by the force of the carbonating gas alone and without the aid of any auxiliary actuating means, such as, pressure or vacuum pumps or the like.

Our invention further relates to a novel water carbonating apparatus wherein the carbonated water is maintained and kept on tap at the discharge nozzle or faucet in predetermined quantities, so that upon operating the apparatus, there will be discharged a given quantity of the carbonated water at one time, which quantity may be varied or adjusted by the proper proportioning of certain parts of the apparatus.

With the above ends in view, our novel water carbonating apparatus consists of a water carbonating battery composed of a series of successive absorption chambers, into which water is drawn by suction created in the gas supply line at one end of the battery by the fluid dispensed from the other end of the battery and through which the water is forced by the direct pressure of the carbonating gas and within which the water is thoroughly admixed with the gas, causing the maximum absorption of same.

Our invention further consists of a novel measuring chamber communicating with the last of the series of absorption chambers, said measuring chamber being provided with a lower check valve for the admission of the carbonated water and an upper float check valve adapted to permit the exit of the entrapped gas and adapted to prevent the exit of the carbonated water.

Our invention further consists of a novel control valve or carbonating valve in conjunction with said carbonating battery and measuring chamber, whereby a source of carbonating gas under pressure, and the first and last of said chambers, as well as the top and bottom of said measuring chamber, are so interconnected, in the two different positions of said valve, that is, in the closed and open positions thereof, as to effect the desired application of the compressed gas in the carbonating process, as well as in the propulsion of the water through said carbonating battery and measuring chamber and also to effect the desired suction necessary to draw in the fresh supply of water into said carbonating battery.

For the purpose of illustrating our invention, we have shown in the accompanying drawings, forms thereof which are at present preferred by us, since they will give in practice satisfactory and reliable results, although it is to be understood that the various instrumentalities of which our invention consists can be variously arranged and organized and that our invention is not limited to the precise arrangement and organization of these instrumentalities as herein shown and described.

Referring to the drawings:—

Figure 1 represents a side elevation of a mixed beverage dispensing and vending apparatus embodying our present invention.

Figure 2 represents a transverse vertical section of the mixing chamber of our novel control valve.

Figure 3 represents a longitudinal section of our novel control valve and mixing chamber.

Figure 4 represents a vertical section of our novel carbonating battery and measuring chamber.

Figure 5 represents a front elevation of the face of the stationary valve block of our novel control valve.

Figure 6 represents a front elevation of the face of the movable or rotary disc of our novel control valve, shown in the closed position with respect to the stationary valve block in Figure 5, and also represented in alignment therewith.

Figure 7 represents a front elevation of the face of the valve block of our novel control valve, similar to that shown in Figure 5.

Figure 8 represents a front elevation of the face of the movable or rotary disc of our novel control valve, similar to that shown in Figure 6; shown in the open position, however, relative to the block shown in Figure 7 and also shown in alignment therewith.

Figure 9 represents a section on line 9—9 of Figure 6.

Figure 10 represents a plan view of the movable or disc portion of our novel control valve.

Figure 11 represents a section on line 11—11 of Figure 6.

Figure 12 represents a section on line 12—12 of Figure 6.

Figure 13 represents a perspective view of the stationary valve block of our novel control valve.

Referring to the drawings, in which like reference characters indicate like parts, with special reference to Figure 1, 1 designates the front or operating panel of a mixed beverage dispensing and vending apparatus, of the general character disclosed and claimed in our copending application, hereinabove referred to, to which our novel carbonating apparatus of our present invention is herein shown particularly applied. Thus, 2 designated a syrup reservoir of the mixed beverage dispensing and vending apparatus, 3 designates a paper cup dispensing device, 4 designates a syrup pump while 5 designates an operating lever or handle, operatively connected to the main shaft 6, which is connected to the valve stem 7 through suitable coupling 8.

Our novel water carbonating apparatus, shown assembled in Figure 1, comprises chiefly a water carbonating battery 9, the mixing chamber and the control valve 11. The aim of our novel apparatus is automatically to draw in a supply of fresh water at the in-take port 12 and to discharge the same in predetermined quantities or portions from a discharge nozzle or faucet 13, fully charged and saturated with gas, from a steel tank or bottle 14, and to discharge the same under pressure of such gas, with a single movement of the valve stem 7 and operating handle or lever 5.

Accordingly, our novel carbonating battery 9 is composed of the lower manifold 15, the upper covering plate 16, and the series of absorption chambers 17, 18 and 19, mounted between said manifold 15 and said cover plate 16. On one end of the manifold 15 is mounted the measuring chamber 20. The first absorption chamber 17, communicating with the inlet opening 12 through the ball check valve 21, seated upon the valve seat 22 by gravity or otherwise, and is also provided with a gas inlet pipe 23 entering through the cover plate 16, which pipe 23 is connected through the tubing 33 with the control valve 11. The bottom of the absorption chamber 17 communicates through a passageway 24 in the manifold 15 with an upright spray tube 25 extending up into the second absorption chamber 18. The spray tube 25 is provided with a ball check valve 26 at the upper end thereof to prevent the retreat of water and gas from the absorption chamber 18 to the absorption chamber 17 and is further provided with a funnel 27 having an upper perforated spraying top. Similarly, each of the absorption chambers 18 and 19, communicates with a corresponding spray tube 28 also having perforated upper spray ends through corresponding passageways 29 in said manifold 15, while the last of the series of absorption chambers 19 communicates with a manifold 30, which is in communication with the measuring chamber 20 mounted upon said manifold 15.

Our novel control valve is composed of the cylindrical casing 81 having the opening 82 at one end thereof for the reception of the valve stem 7 and having threadedly mounted in said end, the stuffing gland 83 for securing the packing 84 about said valve stem 7. The other end of the casing 81 is provided with the annular valve seat 85, in which is rotatably mounted the movable valve disc 86 having the outer valve 87. Between the two ends of the cylindrical casing 81 of the valve, there is provided a mixing chamber 88 into which the carbonated water is discharged through a series of radial discharge openings 80 in said valve stem 7 which is formed integral with the valve disc 86. The mixing chamber 88 is provided with suitable discharge nozzle 89, which is normally closed by the gravity ball check valve 90. A series of check valves 91 carried by the wall of the casing 81 communicate with a corresponding series of syrup pumps 4, through which the syrup of mixed beverage is discharged into said mixing chamber for the purpose of preparing a mixed beverage as brought out more in detail in our copending application hereinabove referred to.

The valve casing 81 is provided with the outwardly extending parallel guide lugs 92 adapted to receive the stationary valve block 93 with said guide lugs seated in the panel 94 between the parallel guide projections 95 of said block, thereby to hold said guide block in constant and accurate alignment with the valve disc 86 of the control valve. Each of the guide lugs 92 is provided with a right angled flange 96 having the threaded openings 97 therein, to which flange is secured, by means of bolts 98, a suitable strap or yoke 99 which carries the central fixing and adjusting screw 100, which is adapted to bear against the outer surface of the valve block, substantially centrally thereof, thereby to maintain the surface 101 of said valve block pressed against the face 87 of the valve disc 86 with a constant pressure. The flange 102 is provided on the valve stem 7 of the control valve 11, for the purpose of maintaining the valve disc 86 fixedly against the axial thrust of the adjusting or set screw 100.

The stationary valve block 93 is provided with a series of passageways 41, 42, 43, 44 and 45, extending from the lower outer surface 103 thereof to the valve face 101 thereof and terminating in the corresponding spaced stationary valve ports 51, 52, 53, 54 and 55 respectively. The valve casing 81, moreover, is provided with a stationary port 58 in the cylindrical surface or valve seat 85 thereof, which stationary port 58 communicates with the atmosphere through a passageway 48 as shown particularly in Figure 3. The movable disc 86 of the control valve is provided with a set of movable ports 61, 62, 63, 64, 65 and 68 respectively, which are so spaced as to coincide with the corresponding stationary ports 51, 52, 53 54, 55 and 58, in the closed or "off" position of the valve disc 86 shown in Figures 5 and 6. There are further provided a series of bypasses between certain of the movable ports above mentioned, that is, the passageway 71 between the ports 61 and 63; the passageway 72 between the ports 62 and 65 and the bypass or passageway between the ports 64 and 68.

The tube 31 directly connects the steel storage tank or bottle 14 with the passageway 41 in the stationary valve block 93 and hence with the stationary valve port 51. The tube 33 connects the gas inlet pipe 23 in the top of the absorption chambers 17 of the carbonating battery 9, with the passageway 43 in the stationary valve block 93 and hence with the stationary port 53.

The tubing 34, in turn, interconnects the top of the measuring chamber 24 with the passageway 44 and the stationary valve port 54. The tubing 35 interconnects the passageway 30 in the manifold 15, in the carbonating battery 9, with the passageway 45 in the stationary valve block 93 and hence with the stationary port 55; and last the pipe 32 interconnects the lower end of the measuring chamber 20 with the passageway 42 in the stationary valve block 93 and hence with the stationary valve port 52, through the passageway 104 in the extreme end of the manifold 15 of said carbonating battery 9.

By means of its pipe connections and through the novel collocation of valve ports and bypasses, it is seen that in the "off" or closed position of the control valve, shown particularly in Figures 5 and 6, the direct pressure of the carbonating gas from the reservoir 14 is transmitted through the pipe 31, the stationary port 51, the movable port 61, the bypass 71, the second movable port 63, the stationary port 53, and hence, through the tubing 33 to the first absorption chamber 17. Here, the pressure of the gas forces the water in said absorption chamber 17 down through the passageway 24 in the manifold 15 and up through the spray tube 25 and spray top in the funnel 27 past the ball check valve 26, into the second absorption chamber 18, where it descends through a dispersing screen or wire gauze 105 located immediately below said perforated top of the funnel. The ball check valve 21 is seated upon the valve seat 22 by gravity and is held there tightly by the pressure of the gas; thereby shutting off the absorption chamber 17 from the inlet opening 12. The pressure of the gas then propels the water and the admixture of water and gas through the successive passage-ways 29 in the manifold 15 and up through the successive spray tubes 28 in the successive absorption chambers 19, each of which is provided with a similar dispersing screen 105, until the water, thus fully carbonated or saturated with gas, is forced in by the pressure of the gas through the passageways 30 and 104, both communicating with the bottom of the measuring chamber 20 and being interconnected, in the closed position of the valve, through the pipes 35 and 32, the stationary ports 55 and 52, the movable ports 65 and 62 and the bypass 72, thereby equalizing the pressure between said two passageways 30 and 104 in the closed position of the valve. The top of the measuring chamber is in turn connected through the pipe 34, the stationary port 54, the movable ports 64 and 68 and the bypass 74, and through the stationary port 58 and the passageway 48 with the atmosphere.

The measuring chamber 20, moreover, is provided with a lower ball check valve 106, of a material heavier than water, seated upon the valve seat 107, between the passageway 30, in the manifold 15, and the lower end of said measuring chamber, and is surrounded by a suitable wire gauze or cage to maintain said ball check valve above the valve seat. The measuring chamber is further provided with a second ball check valve 109, of a material lighter than water, which is adapted to seat outwardly against an upper valve seat 110 when said ball check valve is raised upwardly by the rising level of the carbonated water within said measuring chamber 20, thereby to permit the exit of gas through the tubing 34, and hence through the passageway 48 in the valve casing 81 into the atmosphere, in the closed position of the valve, and adapted to shut off said pipe 34 from the measuring chamber 20 when the level of the water within said chamber has reached the upper end, thereby to confine said water within the measuring chamber.

The movable valve disc 86 is further provided with the movable ports 66 and 67, which are so positioned as to coincide with the stationary ports 52 and 53 respectively, in the open position of the valve shown in Figures 7 and 8. In this position of the valve, moreover, the movable ports 61 and 63 coincides with the stationary ports 54 and 51, thereby interconnecting said ports 54 and 51 through the bypass 71 and hence, directly interconnecting the gas storage tank 14 with the top of the measuring chamber 20 through the pipes 31 and 34 respectively. Moreover, in the open position of the valve, the stationary port 55, which is in communication with the passageway 30 in the manifold 15 through the pipe 35, is shut off by the blank portion of the face 87 of the valve disc 86; while the passageway 104 in said manifold 15, communicating with the bottom of the measuring chamber 20, is connected through the pipe 32 and the stationary port 52 and through the movable port 67 and the bypass 77, with the axial passageway 79 passing into the stem 7 of the valve, which axial passageway 79 terminates in a series of radial discharge openings 80 in said valve stem 7. Thus, in the open position of the valve, the force of the pressure of the gas in the steel reservoir 14, exerted on the top of the measuring chamber 20, through the pipe 24, will force the carbonated water in said measuring chamber 20 out through the bottom thereof and through the pipe 32, the stationary and movable ports 52 and 67 out through the radial discharge openings 80 into the mixing chamber 88. In the valve casing 81, where it mixes with a quantity of flavoring matter, such as syrup, previously deposited therein, into any one of the check valves 91, as shown in Figures 2 and 3.

In the open position of the valve, moreover, shown in Figures 7 and 8, the first of the series of absorption chambers 17 is connected through the pipe 33, the stationary port 53, the movable port 66, and the bypass 76 with the axial passageway 79. Due to the particular positioning of the bypass or passageway 76, in advance of the passageway 77, as shown particularly in Figure 12, the carbonated water passing through said axial passageway 79, during the discharge thereof, past the passageway 76, creates a suction in said passageway 76 and hence in the first of the series of absorption chambers 17. Due to this suction, created in the chamber 17 during the open or discharging position of the valve, the ball check valve 21 is raised from the valve seat 22 and a fresh supply of water is automatically drawn up into said measuring chamber 17.

Upon resetting or returning the valve into its closed position, shown in Figures 5 and 6, the cycle of operations is repeated, and the gas tank is directly connected to the first absorption chamber 17, the pressure of the gas closing the valve 21 and forcing the gas through the series of absorption chambers 18 and 19 and into the measuring chamber 20 past the ball and check valve 106. The carbonated water then again fills the measuring chamber 20 and, in doing so, displaces the gas in said chamber and forces it out through the vent passageway 48, as mentioned hereinabove, until the level of the water in said measuring chamber lifts the ball check valve 109 upwardly against the valve seat 110, thereby again confining within said measuring chamber a predetermined quantity of carbonated water. The ball cage or wire gauze 111 is provided surrounding the ball check valve 109 so as to maintain the same in proximity to the valve seat 110.

In order to obtain a more perfect packing joint between the stationary and movable valve faces 101 and 87 respectively, of the stationary valve block 93 and movable disc 86 respectively, there is provided a stationary leather packing disc 112 between said two valve faces, shown particularly in Figure 3, having openings therethrough corresponding to, and coinciding with each of the stationary port holes 51 and 55 inclusive.

As will be seen from Figure 2, the discharge nozzle 89, normally closed by a gravity ball check valve 90 seated upon the upper terminal thereof. This ball check valve is provided for the purpose of retaining in the mixing chamber 88 a quantity of flavoring material or syrup discharged into it through any one of the check valve devices 90, as brought out hereinbefore, and as brought out particularly in our copending application hereinabove identified. The force of the series of jets of carbonated water, issuing from the series of radial discharge openings 8 during the open position of the valve, is sufficiently strong to displace the ball check valve 90 from above the nozzle 89 and thereby forcing said carbonated water and flavoring matter or syrup, out through the nozzle 89.

It will now be apparent that we have devised a novel and useful water carbonating apparatus which embodies the features of advantage enumerated as desirable in the statement of the invention and the above description, and while we have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described our invention, what we claim as new and desire to secure by Letters Patent is:—

1. In a device of the character stated, a carbonating battery having a water inlet opening, and having at one end thereof a measuring chamber, a gas inlet, opening into said carbonating battery, a control valve, a stationary port in said valve communicating with a source of compressed gas supply, a second stationary port therein, communicating with the bottom of said measuring chamber, a third stationary port communicating with said gas inlet opening into said carbonating battery, a fourth stationary port communicating with the top of said measuring chamber, a movable element in said valve, series of movable ports corresponding to, and coinciding with, the first, third and fourth of said stationary ports in the open position of said movable valve element, a bypass in said movable valve element, interconnecting the first and third of said movable ports, and a passageway therein, interconnecting said fourth movable port, and hence the top of said measuring chamber, with the atmosphere, and a float controlled check valve intermediate of the top of said measuring chamber and the stationary port corresponding thereto, thereby to shut off said measuring chamber from said port with the rise of the liquid in said measuring chamber.

2. In a device of the character stated, a carbonating battery having a gas inlet and a water inlet, a measuring chamber communicating with one end of said battery, a control valve, a stationary port in said control valve communicating with a source of compressed gas supply, a second stationary port therein communicating with the bottom of said measuring chamber, a third stationary port therein communicating with the gas inlet to said carbonating battery and a fourth stationary port communicating with the top of said measuring chamber, a movable valve portion in said control valve having a series of movable ports therein, coinciding with said first, third, and fourth stationary ports in the closed position of said movable valve portion, a passageway within said movable valve portion interconnecting said first and third movable ports, a passageway therein connecting said fourth movable port with the atmosphere, a pair of movable ports in said movable valve portion to coincide with said third and second stationary ports respectively, in an open position of said movable valve portion; said first and third movable ports being so positioned as to coincide with the fourth and first stationary ports respectively in said open position of the valve, and passageways within said movable valve portion to interconnect said pair of movable ports with a discharge opening, within said movable portion, in such a manner as to effect a jetting action through said third stationary port, in said open position of the valve.

3. In a device of the character stated, a carbonating battery having a water inlet and a gas inlet, a measuring chamber communicating with one end thereof, a control valve, a stationary port in said valve communicating with a source of compressed gas supply, a second stationary port therein communicating with the bottom of said measuring chamber, a third stationary port therein communicating with said gas inlet, a fourth stationary port therein communicating with the top of said measuring chamber and a fifth stationary port therein communicating with said carbonating battery at a point intermediate of the end of said carbonating battery and said measuring chamber, a movable valve portion in said control valve having a series of movable ports corresponding to, and coinciding with said first, second, third, fourth and fifth stationary ports respectively, in the closed position of said movable valve portion, a passageway within said movable valve portion interconnecting said first and third movable ports, a passageway therein interconnecting said second and fifth movable ports and a passageway therein to connect said fourth movable port with the atmosphere, a sixth and a seventh movable port in said movable valve portion adapted to coincide with said third and second stationary ports respectively in an open position of said movable valve portion; said first and third movable ports being so positioned as to coincide with the fourth and first stationary ports respectively in said open position of said movable valve portion, a passageway in said movable valve portion interconnecting said sixth and seventh movable ports with a discharge opening in such a manner as to cause the liquid passing through said last mentioned passageway to create suction in said sixth movable port and hence in the said gas inlet and said carbonating battery, in said open position of said movable valve portion.

4. In a device of the character stated, a carbonating battery having a water inlet and a gas inlet, a measuring chamber communicating with one end thereof, a control valve, a stationary port in said valve communicating with a source of compressed gas supply, a second stationary port therein communicating with the bottom of said measuring chamber, a third stationary port therein communicating with said gas inlet, a fourth stationary port therein communicating with the top of said measuring chamber and a fifth stationary port therein communicating with said carbonating battery at a point intermediate of the end of said carbonating battery and said measuring chamber, a movable valve portion in said control valve having a series of movable ports corresponding to and coinciding with said first, second, third, fourth and fifth stationary ports respectively, in the closed position of said movable valve portion, a passageway within said movable valve portion interconnecting said first and third movable ports, a passageway therein interconnecting said second and fifth movable ports and a passageway therein to connect said fourth movable port with the atmosphere, a sixth and a seventh movable port in said movable valve portion adapted to coincide with said third and second stationary ports respectively in an open position of said movable valve portion; said first and third movable ports being so positioned as to coincide with the fourth and first stationary ports respectively in said open position of said movable valve portion, a passageway in said movable valve portion interconnecting said sixth and seventh movable ports with a discharge opening in such a manner as to cause the liquid passing through said last mentioned passageway to create suction in said sixth movable port, hence in the said gas inlet and said carbonating battery, in said open position of said movable valve portion, and a float controlled check valve intermediate of the top of said measuring chamber and the corresponding stationary port, thereby to shut off said measuring chamber from said port with the rise of the liquid in said measuring chamber.

5. In a device of the character stated, a carbonating battery having a gas inlet and water inlet, a measuring chamber communicating with one end of said battery, a control valve, a stationary port in said control valve communicating with a source of compressed gas supply, a second stationary port therein communicating with the bottom of said measuring chamber, a third stationary port therein communicating with the gas inlet to said carbonating battery and a fourth stationary port communicating with the top of said measuring chamber, a movable valve portion in said control valve having a series of movable ports therein coinciding with said first, third and fourth stationary ports in the closed position of said movable valve portion, a passageway within said movable valve portion interconnecting said first and third movable ports, a passageway therein connecting said fourth movable port with the atmosphere, a pair of movable ports in said movable valve portion to coincide with said third and second stationary ports respectively in an open position of said movable portion; said first and third movable ports being so positioned as to coincide with the fourth and first stationary ports respectively in said open position of the valve, passageways within said movable valve portion to interconnect said pair of movable ports with a discharge opening, within said movable portion, in such a manner as to effect a jetting action through said third stationary port, in said open position of the valve, and a float controlled check valve intermediate of the top of said measuring chamber and the corresponding stationary port, thereby to shut off said measuring chamber from said port with the rise of the liquid in said measuring chamber.

WILLIAM C. DE ARMOND.
WILLIAM RAY H. WATT.